United States Patent Office 3,328,334
Patented June 27, 1967

3,328,334
VINYL RESINS PLASTICIZED WITH FORMALS OF TETRAHYDROFURFURYL ALCOHOL
Charles H. Fuchsman, Cleveland Heights, Ohio, assignor to Ferro Corporation, Cleveland, Ohio, a corporation of Ohio
No Drawing. Filed May 14, 1964, Ser. No. 367,539
10 Claims. (Cl. 260—30.4)

The invention relates to new compositions of matter and more particularly to improved plastic compositions having certain acetals utilized therein.

During the manufacture of halogen containing vinyl resins, various compounds such as stabilizers and plasticizers are normally incorporated into the vinyl composition to improve the characteristics thereof thus increasing the value of the resin as a finished product. The latter compounds or plasticizers, are employed to increase the flexibility, workability and other physical properties of the resin.

It has been found that the addition of certain acetal materials to the resin composition results in better or increased physical properties and a faster solvation of the resin than is obtained with a conventional plasticizer alone.

Accordingly, a primary object of this invention is to provide an improved and novel composition of matter which exhibits an improved plasticizing effect on halogen containing polyvinyl resins.

A further object of this invention an improved and novel composition of matter having a plasticizing system composed of a conventional plasticizer and a lesser amount of an acetal prepared from an oxygen containing ring compound.

Another object is to provide an improved and novel composition having a plasticizing system composed of a conventional plasticizer and bis(tetrahydrofurfuryl) formal.

Other objects will become apparent as the description proceeds.

The present inventor has discovered that when between 1 and 25 parts per hundred parts of resin of an acetal of an oxygen containing ring compound, preferably bis(tetrahydrofurfuryl) formal, have been incorporated into vinyl halide polymers in the presence of a larger quantity of a plasticizer (e.g. from 25 to 49 parts per hundred parts of resin) of the kind discussed below, the resultant plasticized vinyl halide composition has in general enhanced strength, enhanced elongation and faster resin solvation characteristics. The mechanism by which the above characteristics are obtained would seem to involve synergism between the plasticizer and the acetal compound, although I don't wish to be bound by this theory.

Thus, briefly stated the invention involves a composition of matter comprising a halogenated vinyl resin, a plasticizer and an acetal compound to be later described in detail which is responsible for the increased benefits of the plasticizer system.

The term halogenated vinyl resins includes vinyl halide homopolymers, vinyl halide co-polymers with vinyl acetate and vinyl halide co-polymers with vinylidene halides. It also includes post-halogenated polyvinyl polymers. Various mixtures of the resins may be resorted to according to the individual desires or to meet the necessary physical requirements. The halide utilized is preferably the chloride although the fluoride or bromide may also be employed, and as used throughout this specification and claims, the term "halide" shall include, but be limited to, these three halogens.

The plasticizers employed within the scope of this invention are esters obtainable from alcohols containing 1 to 4 hydroxyl groups and acids containing 1 to 3 acidic hydrogen atoms. These esters are normally liquid at room temperature and have a boiling point at atmospheric pressure not below 300° F. Examples of the above compounds are di(2-ethylhexyl) phthalate, diisodecyl phthalate, di(tetrahydrofurfuryl) phthalate, di(2-ethylhexyl) azelate, di(2-ethylhexyl) sebacate, pentaerythritol tetracaprate, butyl benzyl phthalate, di(isooctyl) phthalate, epoxidized soya bean oil and tricresyl phosphate. It will be understood that this list is only illustrative and that other plasticizers may also be employed if desired.

Referring to the acetal compound used in this invention, it should be noted that the said acetal is prepared from oxygen containing ring compounds. Although various acetals are operative in this invention, the preferred compound is bis(tetrahydrofurfuryl) formal. These compounds all have the general formula:

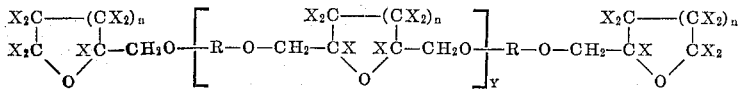

where $n$ is an integer from 1 to 2, $Y$, is an integer from 0 to 4, R an alkylidene group of 1 to 8 carbon atoms and X is selected from a member of the group consisting of hydrogen and alkyl radical.

The above compound may be obtained by mixing an oxygen containing ring compound such as tetrahydrofurfuryl alcohol or tetrahydropyran-2-methanol with paraldehyde (an acetaldehyde trimer), formaldehyde or methylene chloride and reacting the same to produce an acetal or formal of tetrahydrofurfuryl alcohol. Where methylene chloride is used instead of formaldehyde, a suitable base must be used to neutralize the resulting hydrogen chloride. These compounds have very strong solvency for a resin such as polyvinyl chloride and copolymers of vinyl chloride and other vinyl polymers and in addition to the strong solvent power have a relatively high boiling point. This combination of properties is unexpected inasmuch as usually only the very low boiling point solvents have a strong solvating power for polyvinyl chloride resins and, usually the higher the boiling point, the lower the solvent power. The compounds are unusual also in that the chemical structural unit C—O—C—O—C which characterizes acetals is quite unusual among industrially significant solvents. The strong solvent properties of these compounds are believed to be related to this structure.

As stated previously, the preferred compound employed in this invention is bis(tetrahydrofurfuryl) formal (BTFF), and reference is directed to Patents 2,153,134 and 3,072,607, which are of particular interest relative to this compound and to other related acetals. In the preferred method of making this specific compound approximately 2 to 2¼ equivalent weights of tetrahydrofurfuryl alcohol are reacted in an acidic solution with about 1 equivalent weight of formaldehyde to provide the additional plasticizing compound utilized in the present invention. The tetrahydrofurfuryl alcohol, which is the preferred oxygen containing ring compound starting material, can be reacted with another aldehyde in place of the previously described formaldehyde to produce an acetal of tetrahydrofurfuryl alcohol in which two adjacent tetrahydrofurfuryl alcohol rings are always spaced by the grouping

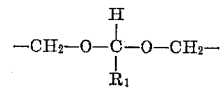

where $R_1$ is an alkyl group of 1 to 6 and preferably 1 to 3 carbon atoms.

While BTFF is the preferred compound that is utilized in the present composition, other acetals may also be used, bis(tetrahydropyran-2-methyl) formal is one of these and is prepared by mixing substantially 3 moles of tetrahydropyran-2-methanol and 1.5 moles of 91% paraformaldehyde and 4.0 ml. of 38% HCl and 50 grams of toluene. The mixture is heated for a few hours and then the water is removed by azeotropic distillation. This mixture is then neutralized with sodium carbonate and then vacuum filtered. The filtrate is distilled to obtain the desired compound.

Another desirable compound employed in the composition of this invention is the diformal of tetrahydrofurfuryl alcohol and 2,5 dimethyl tetrahydrofuran having the formula

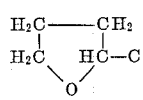 —CH$_2$—O—CH$_2$—O—CH$_2$—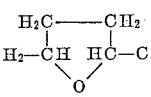—CH$_2$—O—CH$_2$—O—CH$_2$—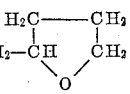

This compound is prepared by mixing an approximate 9:1 molar ratio of tetrahydrofurfuryl alcohol and 2,5 bis(hydroxymethyl) tetrahydrofuran about 2.2 moles of formaldehyde and HCl is added as a catalyst. Toluene is also added to remove the water azeotropically. The resulting mixture contains about 1 part of the diformal of tetrahydrofurfuryl alcohol and 2,5 dimethylol tetrahydrofuran and about 3½ parts of bis(tetrahydrofurfuryl) formal.

Similarly the tetrahydrofurfuryl-terminated polyformal of 2,5 dimethylol tetrahydrofuran having the formula

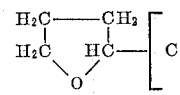—[ CH$_2$—O—CH$_2$—O—CH$_2$—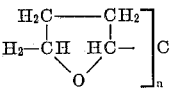— ]$_n$ CH$_2$—O—CH$_2$—O—CH$_2$—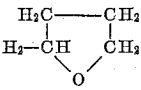

where $n$ is an integer of from 1 to 4 is prepared by using an approximate 1 to 1 ratio of tetrahydrofurfuryl alcohol and 2,5 bis(hydroxymethyl) tetrahydrofuran, HCl is added as a catalyst and toluene is added to azeotropically remove the water. Here the resulting mixture of terminated polyformals would be expected, on statistical grounds, to contain a significant proportion of 3,5 and 6 ring compounds in addition to the theoretical 4 ring structure.

The plasticizing system involved in this invention comprising the above mentioned plasticizers and an acetal may be incorporated into the vinyl resin by a variety of methods. It can be added to the resin utilizing hot rolls or other machines employed to mix resins. The important requisite is that resin and the plasticizing system be completely dispersed one within the other.

The invention will be further illustrated by the following examples showing results which are consistent with the theory set forth earlier of a synergistic effect of various acetals and the plasticizer.

For the following examples the basic composition below is used:

Example I

Standard compositions of 100 parts of polyvinyl chloride resin, 50 parts per hundred parts of resin of a plasticizing system, 2.5 parts per hundred parts of resin of a barium-cadmium stabilizer and 0.25 part per hundred parts of resin of stearic acid were mixed or milled for 10 minutes at 330° F., pressed at 350° F. for 3 minutes at 32,000 pounds pressure to form plaques having a thickness of substantially 65 mils, cut into dumbbell shapes by a die, aged 24 hours at room conditions and tested for tensile strength (p.s.i.), percent elongation and hardness (Shore "A"). The plasticizing system for this and the following several examples involve a conventional phthalate plasticizer and bis(tetrahydrofurfuryl) formal (BTFF) varied as to the amount of each of the foregoing components and the following comparative results were noted:

| Dioctyl phthalate (phr.) | BTFF (phr.) | Hardness (Shore A) | Elongation (percent) | Tensile Strength (p.s.i.) |
|---|---|---|---|---|
| 50 | 0 | 89 | 402 | 2,411 |
| 40 | 10 | 87 | 446 | 2,760 |
| 25 | 25 | 86 | 507 | 2,326 |
| 0 | 50 | 83 | 375 | 1,430 |

It will be seen that the inclusion of BTFF in the composition as set forth above resulted in a significant improvement in the percent elongation up to level wherein 50 percent of the phthalate plasticizer is substituted by BTFF. The tensile strength improved considerably when the BTFF replaced about 20 percent of the original phthalate plasticizer. The hardness did not significantly change at any level of the plasticizer and BTFF relationship.

The elongation test in this and the following example was run by preparing samples about 65 mils thick of a standard dumbbell shape, and subjecting them to linearly increasing tension until they break. The increase in length of the specimen, which is solidly confined to the narrow "neck" of the sample is noted as follows: The length of the "neck" at failure, divided by the length of the neck in the original unstressed sample, and the quotient thus obtained multiplied by 100, gives the "percent elongation." The tensile strength is the force exerted at failure divided by the *original* cross sectional area of the "neck."

Example II

The same procedure was followed as in Example I, using diisodecyl phthalate as the plasticizer.

The following results were obtained.

| Diisodecyl phthalate (phr.) | BTFF (phr.) | Hardness (Shore A) | Elongation (percent) | Tensile Strength (p.s.i.) |
|---|---|---|---|---|
| 50 | 0 | 92 | 446 | 2,510 |
| 40 | 10 | 93 | 487 | 2,710 |
| 25 | 25 | 91 | 418 | 2,650 |
| 0 | 50 | 83 | 375 | 1,430 |

Optimum results were obtained in percent elongation and tensile strength when about 20 percent of the plasticizer was replaced by an equivalent amount of BTFF. Hardness was not significantly affected.

Example III

The same procedure was followed as in Example I, using di(tetrahydrofurfuryl)phthalate as the plasticizer.

The following results were obtained.

| Di(tetrahydro-furfuryl) phthalate (phr.) | BTFF (phr.) | Hardness (Shore A) | Elongation (percent) | Tensile Strength (p.s.i.) |
|---|---|---|---|---|
| 50 | 0 | 96 | 378 | 2,860 |
| 40 | 10 | 96 | 408 | 2,850 |
| 25 | 25 | 92 | 354 | 2,140 |
| 0 | 50 | 83 | 375 | 1,430 |

Here optimum results were also obtained in elongation and tensile strength when about 20 percent of the plasticizer was replaced by an equivalent amount of BTFF. There is a considerable loss in these properties when the BTFF content exceeds the optimum. Hardness is reduced when the BTFF replaces substantially 50 percent or more of this plasticizer.

*Example IV*

The same procedure was followed as in Example I. However, here and in the following example, the primary plasticizer involved was based on alkyl esters of straight chain dicarboxylic acids.

The following results were obtained:

| Dioctyl sebacate (phr.) | BTFF (phr.) | Hardness (Shore A) | Elongation (percent) | Tensile Strength (p.s.i.) |
|---|---|---|---|---|
| 50 | 0 | 87 | 385 | 2,066 |
| 40 | 10 | 84 | 520 | 2,732 |
| 25 | 25 | 82 | 566 | 2,482 |
| 0 | 50 | 83 | 375 | 1,430 |

*Example V*

The same procedure was followed as in Example IV, using di(2-ethylhexyl)azelate as the plasticizer.

| Di(2-ethyl-hexyl) azelate (phr.) | BTFF (phr.) | Hardness (Shore A) | Elongation (percent) | Tensile Strength (p.s.i.) |
|---|---|---|---|---|
| 50 | 0 | 87 | 300 | 1,750 |
| 40 | 10 | 87 | 500 | 2,560 |
| 25 | 25 | 86 | 463 | 2,480 |
| 0 | 50 | 83 | 375 | 1,430 |

Similar results were obtained as in Example IV, that is best and highly improved results occurred when 20 percent of the plasticizer were replaced with BTFF.

*Example VI*

The same procedure was followed as in Example I. However, here and in the following example, the plasticizer involved was based on esters of monocarboxylic acids with polyhydric alcohols.

| Pentaerythritol tetracaprate (phr.) | BTFF (phr.) | Hardness (Shore A) | Elongation (percent) | Tensile Strength (p.s.i.) |
|---|---|---|---|---|
| 50 | 0 | 90 | 463 | 2,630 |
| 40 | 10 | 89 | 464 | 2,800 |
| 25 | 25 | 88 | 378 | 2,570 |
| 0 | 50 | 83 | 375 | 1,430 |

Best results were obtained with a 20 percent replacement of plasticizer with BTFF. A higher proportion of BTFF causes a material loss in elongation and strength properties.

*Example VII*

The same procedure was followed as in Example VI, using epoxidized soya bean oil as the plasticizer.

| Epoxidized soya bean oil (phr.) | BTFF (phr.) | Hardness (Shore A) | Elongation (percent) | Tensile Strength (p.s.i.) |
|---|---|---|---|---|
| 50 | 0 | 92 | 442 | 2,620 |
| 40 | 10 | 91 | 460 | 2,710 |
| 25 | 25 | 90 | 446 | 2,610 |
| 0 | 50 | 83 | 375 | 1,430 |

Again optimum results were obtained when substantially 20 percent of the plasticizer was replaced with BTFF.

*Example VIII*

The same procedure was followed as in Example VI, using tricesyl phosphate as the plasticizer.

| Tricresyl phosphate (phr.) | BTFF (phr.) | Hardness (Shore A) | Elongation (percent) | Tensile Strength (p.s.i.) |
|---|---|---|---|---|
| 50 | 0 | 97 | 335 | 2,870 |
| 40 | 10 | 95 | 363 | 2,830 |
| 25 | 25 | 93 | 343 | 2,430 |
| 0 | 50 | 83 | 375 | 1,430 |

Optimum elongation test results were obtained when 20 percent of the tricesylphosphate was replaced with BTFF.

*Example IX*

Here the same procedure for formulating the composition was followed as in Example I including the use of dioctyl phthalate (DOP). However the resin involved comprised a vinyl chloride-vinyl acetate copolymer in which the proportion of vinyl acetate therein is substantially 13 percent.

| Dioctyl phthalate (phr.) | BTFF (phr.) | Hardness (Shore A) | Elongation (percent) | Tensile Strength (p.s.i.) |
|---|---|---|---|---|
| 40 | 0 | 89 | 242 | 1,310 |
| 30 | 10 | 84 | 312 | 950 |
| 20 | 20 | 78 | 294 | 550 |

Using this copolymer a considerable increase in elongation properties occurred when substantially 25 percent of the plasticizer was replaced with BTFF. The tensile strength herein, however, was reduced.

*Example X*

The same procedure was followed as in Example IX including the same plasticizer DOP. However, the vinyl acetate proportion in the vinyl chloride-vinyl acetate resin was substantially 5 percent.

| Dioctyl phthalate (phr.) | BTFF (phr.) | Hardness (Shore A) | Elongation (percent) | Tensile Strength (p.s.i.) |
|---|---|---|---|---|
| 40 | 0 | 95 | 350 | 2,780 |
| 30 | 10 | 94 | 340 | 2,950 |
| 20 | 20 | 93 | 395 | 2,820 |

Best results occurred when substantially 25 percent of the dioctyl phthalate plasticizer was replaced with BTFF. The strength was considerably increased at this proportion of primary plasticizer and BTFF. However, at substantially 50% replacement of the dioctyl phthalate with BTFF, increased results were also obtained in both elongation and strength properties.

*Example XI*

Here the same procedure was followed as in Example IX also using dioctyl phthalate. The resin used in the composition was, however, a vinyl chloride-vinylidene dichloride copolymer in which the vinylidene chloride was substatnially 10 percent.

| Dioctyl phthalate (phr.) | BTFF (phr.) | Hardness (Shore A) | Elongation (percent) | Tensile Strength (p.s.i.) |
|---|---|---|---|---|
| 40 | 0 | 92 | 345 | 2,380 |
| 30 | 10 | 92 | 395 | 2,310 |
| 20 | 20 | 91 | 309 | 2,120 |

Best results were also found when substantially 25 percent of the plasticizer was replaced with BTFF. An increased elongation occurred at this proportion of the plasticizer and BTFF.

*Example XII*

In this example, the same compositions were employed in the manner set forth in prior Example I. However, the plasticizing system utilized a conventional dioctyl phthalate plasticizer and about a 1:3½ mixture of the diformal of tetrahydrofurfuryl alcohol and 2, 5 dimethylol tetrahydrofuran and bis(tetrahydrofurfuryl) formal.

| Dioctyl phthalate (phr.) | Diformal mixture (phr.) | Hardness (Shore A) | Elongation (percent) | Tensile Strength (p.s.i.) |
|---|---|---|---|---|
| 50 | 0 | 88 | 402 | 2,410 |
| 40 | 10 | 86 | 390 | 2,590 |
| 25 | 25 | 85 | 410 | 2,700 |

The inclusion of the diformal mixture in the composition resulted in considerable improvement of the tensile strength. At increasing formal content, the hardness is decreased, showing the effect of increased efficiency of plasticization.

*Example XIII*

The same procedure and ingredients including the dioctyl phthalate plasticizer were employed in this example as in the previous Example XII. However, the tetrahydrofurfuryl-terminated polyformal of 2,5 dimethylol tetrahydrofuran was utilized as the bis(tetrahydrofurfuryl) formal (BTFF) homolog. It should be pointed out that actually this BTFF homolog is a mixture of 3, 4, 5 and 6 ring compounds all of which has been previously set forth above.

| Dioctyl phthalate (phr.) | BTFF (phr.) | Hardness (Shore A) | Elongation (percent) | Tensile Strength (p.s.i.) |
|---|---|---|---|---|
| 50 | 0 | 88 | 402 | 2,410 |
| 40 | 10 | 87 | 440 | 2,740 |
| 25 | 25 | 85 | 440 | 2,800 |

Here an increased elongation and tensile strength occurred up to a substitution of 50 percent of the plasticizer by the terminated polyformal. Hardness decreased with increasing formal content, again showing the effect of improved plasticization.

*Example XIV*

As in Example XIII, the same procedure and ingredients were utilized as the previous examples. The plasticizer used is dioctyl phthalate and the BTFF homolog is bis(tetrahydropyran-2-methyl) formal.

| Dioctyl phthalate (phr.) | Bis(tetrahydropyran-2-methyl) formal (phr.) | Hardness (Shore A) | Elongation (Percent) | Tensile Strength (p.s.i.) |
|---|---|---|---|---|
| 50 | 0 | 88 | 402 | 2,419 |
| 40 | 10 | 87 | 380 | 2,610 |
| 25 | 25 | 88 | 410 | 2,780 |

Here we note that a definite increase in tensile strength occurs at all levels of plasticizer and formal substitution thereof.

The plasticizers of this invention are employed in varying amounts but they normally are present from about 25 to 49 parts per hundred parts of resin. The acetals used in conjunction with the plasticizers are present in amounts from about 1 to 25 parts per hundred parts of resin.

Thus, it can be seen from the foregoing examples that the incorporation of a plasticizing system comprising a plasticizer as discussed above and an acetal, preferably bis(tetrahydrofurfuryl) formal to a halide containing vinyl resin causes improvements in the physical characteristics of the said resin over those achieved when a conventional plasticizer alone is used. It would appear that the strength and elongation properties are the ones most commonly affected.

Having thus described my invention, what I claim is:

1. A composition of matter comprising a major portion of a mixture of a vinyl resin selected from the group consisting of vinyl halide homopolymers, vinylidene halide homopolymers, copolymers of a vinyl halide and a vinylidene halide, copolymers of a vinyl halide and vinylacetate and copolymers of a vinylidene halide and vinylacetate, a stabilizer and from 1 to 50 parts by weight per 100 parts by weight of resin, of a plasticizer, said plasticizer being an acetal having the general formula:

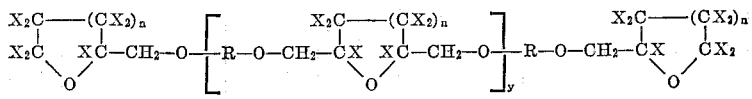

wherein $n$ is an integer from 1 to 2, Y is an integer from 0 to 4, R an alkylidene group of 1 to 8 carbon atoms and X is selected from the group consisting of hydrogen and an alkyl radical having less than 4 carbon atoms.

2. The composition according to claim 1 wherein said acetal is bis(tetrahydrofurfuryl) formal.

3. The composition according to claim 1 wherein R is $CH_2$.

4. The composition according to claim 1 wherein said acetal is the diformal of tetrahydrofurfuryl alcohol and 2,5 dimethylol tetrahydrofuran.

5. The composition according to claim 1 wherein said acetal is a mixture of bis(tetrahydrofurfuryl) formal with a member selected from the group consisting of bis(tetrahydropyran-2-methyl) formal and the diformal of tetrahydrofurfuryl alcohol and 2,5 dimethylol tetrahydrofuran.

6. A composition of matter comprising a major portion of a mixture of a vinyl resin selected from the group consisting of vinyl halide homopolymers, vinylidene halide homopolymers, copolymers of a vinyl halide and a vinylidene halide, copolymers of a vinyl halide and vinylacetate and copolymers of a vinylidene halide and vinylacetate, about 1 to 5 parts by weight of stabilizer per 100 parts by weight of resin, about 25 to 49 parts per hundred parts of resin of a first plasticizer, said first plasticizer being an ester derived from an alcohol containing one to four hydroxyl groups and an acid containing 1 to 3 acidic hydrogen atoms, and about 1 to 25 parts per hundred parts of resin of a second plasticizer, said second plasticizer being an acetal having the general formula:

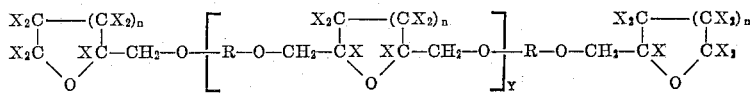

wherein $n$ is an integer from 1 to 2, Y is an integer from 0 to 4, R an alkylidene group of 1 to 8 carbon atoms and X is selected from the group consisting of hydrogen and an alkyl radical having less than 4 carbon atoms.

7. The composition according to claim 6 wherein said acetal is bis(tetrahydrofurfuryl) formal.

8. The composition according to claim 6 wherein said acetal is bis(tetrahydropyran-2-methyl) formal.

9. The composition according to claim 6 wherein R is $CH_2$.

10. The composition according to claim 6 wherein said acetal is a mixture of bis(tetrahydrofurfuryl) formal with a member selected from the group consisting of bis(tetrahydropyran-2-methyl) formal and the diformal of tetrahydrofurfuryl alcohol and 2,5 dimethylol tetrahydrofuran.

References Cited
UNITED STATES PATENTS

| | | | |
|---|---|---|---|
| 2,153,134 | 4/1939 | Dickey et al. | 260—347.8 |
| 2,993,915 | 7/1961 | Luskin | 260—347.8 |
| 3,072,607 | 1/1963 | Fisch et al. | 260—347.8 |

MORRIS LIEBMAN, *Primary Examiner.*

L. T. JACOBS, *Assistant Examiner.*